March 7, 1961 D. J. COOK ET AL 2,973,832
FLAME ARRESTOR FOR AIR FILTER
Filed July 21, 1958
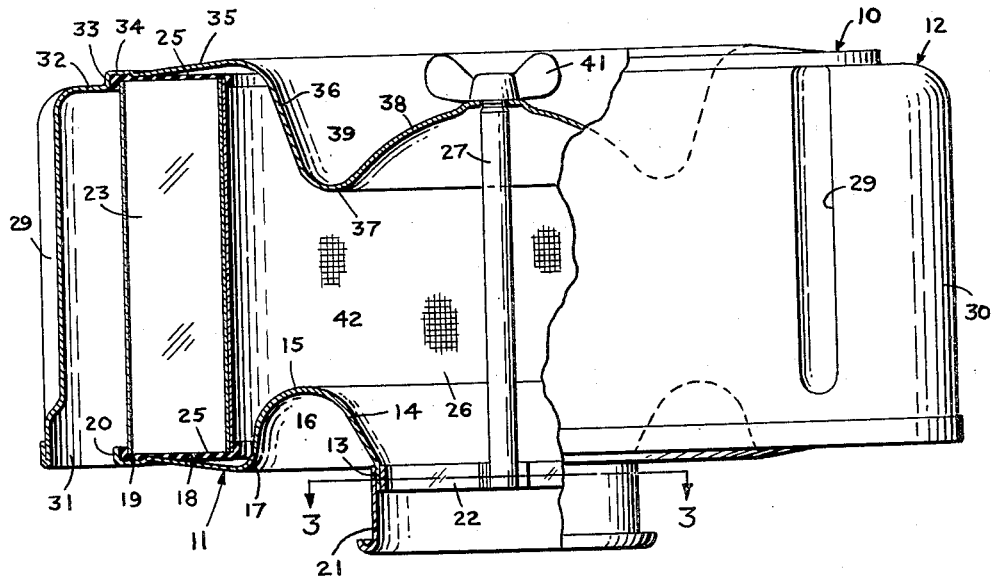
FIG. 1
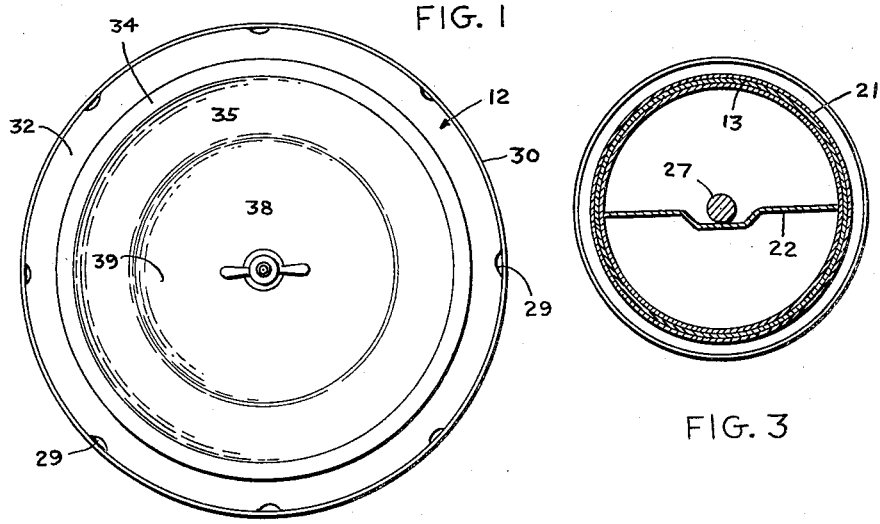
FIG. 2
FIG. 3
DONALD J. COOK
PATRICK J. SCHOEMER
INVENTORS
BY Lawrence J. Winter
atty.

United States Patent Office 2,973,832
Patented Mar. 7, 1961

2,973,832

FLAME ARRESTOR FOR AIR FILTER

Donald J. Cook, Livonia, and Patrick J. Schoemer, Wayne, Mich., assignors to Purolator Products, Inc., Rahway, N.J., a corporation of Delaware Filed July 21, 1958, Ser. No. 749,976

2 Claims. (Cl. 183—71)

The present invention relates to an air filter and more particularly to a flame arrestor for an air filter.

Air filters used to remove contaminants from intake air supplied to the carburetor of an internal combustion engine are commonly made of paper material that has been impregnated with resin, such as phenolformaldehyde. This type of air filter, generally known as a dry type air filter, as distinguished from the oil bath type air filter, is very efficient but one disadvantage with the use of such a filter has been encountered. This is due to the fact that internal combustion engines on occasion will backfire or misfire. When this occurs flame will shoot out of the air intake opening to the carburetor and will sometimes ignite the paper filter element causing destruction of the element and in more serious cases igniting other parts of the engine. One method evolved for eliminating this problem is to treat the paper filter element with a flameproofing material during the manufacture thereof. However, this adds more steps to the process of manufacturing the paper, increases the cost thereof and new problems are introduced because the flameproofing process may change the filtering properties and characteristics of the filter paper.

An object of the present invention is to provide a mechanical flame arrestor for a dry type air filter by providing a flame arrester formed integral with the housing structure that is of simple and economical construction so that no additional expenses are involved in the manufacture of the filter even with the built in flame arrester.

The invention will be better understood from the following description when considered in connection with the accompanying drawing forming a part thereof, and in which:

Fig. 1 is a side elevational view of the filter of the present invention, with parts broken away to show the interior construction.

Fig. 2 is a plan view of the filter of Fig. 1 taken on a reduced scale, and

Fig. 3 is a section taken on line 3—3 of Fig. 1.

Referring to the drawings, the reference numeral 10 designates a filter housing comprising a metal fabricated lower and upper casing 11 and 12 respectively. Casing 11 is an annular member comprising a central tube or flange 13 forming an air outlet opening to which is joined an upwardly and outwardly inclined section 14 having its upper end joined to a downwardly curved section 15 to provide an interior annular concave recess 16. The lower end of 15 curves outwardly as at 17. The casing then extends laterally upwardly as at 18 and terminates in a horizontal direction as at 19. A lip 20 is disposed on the periphery of the casing so that 18 and 19 form a seat for the filter element described later. An outlet tube 21 is secured to tube 13 on the outside thereof while a cross bar member 22 is secured to the inside of tube 13.

An annular resin impregnated pleated paper filter element 23 having end caps 25 sealing the opposite ends thereof is seated on casing 11 adjacent lip 20. The end caps are preferably made of a plastic material such as polyvinylchloride, commonly known as plastisol. The horizontal and inclined portions 18 and 19 of casing 11 form a seat for lower end cap 25 to prevent air from by-passing the bottom of the filter element. Woven wire cloth 26 having the edges thereof also imbedded in the end caps is positioned adjacent the inside of the paper pleats.

A vertical bolt member 27 is secured at its lower end to cross bar 22 and extends upwardly above casing 11.

Upper casing 12 comprises a cylindrical member with spaced vertical flutes 29 in the side wall 30 thereof. The lower end of wall 30 is spaced from peripheral flange 20 of casing 11 so that an annular air inlet 31 for intake air is provided therebetween. The top of casing 12 comprises a peripheral horizontal portion as at 32 which extends vertically as at 33 and then horizontally as at 34, these latter two portions being complementary to 19 and 20 of casing 11. Casing 12 is thereafter provided with an upwardly inclined section 35 extending beyond the inner end of end cap 25. Section 35 is complementary to 18 of casing 11. Thus, it can be seen that parts 33, 34 and 35 form a seat for the upper end cap 25, similar to the seat formed in the lower casing for seating the lower end cap.

The casing, thereafter, extends sharply downwardly about one third of the height of the filter element as at 36 and at an angle of approximately 60° with a plane perpendicular to the geometric axis of the filter. A concave section 37 is joined to the lower end of 36 and in turn terminates in a convex or dome shaped section 38 which has a central opening therein for bolt member 27. Sections 36, 37 and 38 form an annular concave recess 39 in the casing. A wing nut 41 is disposed on bolt member 27 and tightened down so that sections 18 and 19 of casing 11 and 34 and 35 of casing 12 bite into or are pressed against the respective end caps of the filter element to provide a sealing relationship therebetween.

It will be noted that the sections 36, 37 and 38 of casing 12 form a flame arrestor formed integral with the upper casing and that a restricted passage 42 is formed between section 37 of casing 12 and section 15 of casing 11. With this structure, should the internal combustion engine accidentally misfire or backfire, any flame or heat front emanating through tube 21 will take a vertical course impinging upon the dome portion 38 of casing 12. Striking the curved surface of the dome causes the flame to be directed downwardly and outwardly and away from the upper portion of the filter element. Thus, the flame arrestor of the present invention prevents the flame from striking the paper filter element immediately and causing it to burn by increasing the distance it has to travel before contacting the filter paper to provide a time lag in which the heat is dissipated over a greater area, or by directing the heat front at an acute angle with the lower portion of the paper to prevent burning.

Inasmuch as various changes may be made in the form, location and relative arrangement of the several parts without departing from the essential characteristics of the invention, it will be understood that the invention is not to be limited except by the scope of the appended claims.

What is claimed is:

1. A filter comprising a housing for a filter element defined by a top cylindrical casing and an annular bottom casing, said bottom casing comprising a center tube forming an air outlet opening, joined to an upwardly and outwardly inclined portion joined to a downwardly curved portion providing an annular recess, said bottom casing thereafter extending laterally upwardly, and then horizontally, a peripheral lip on said horizontal portion, an annular pleated paper filter element having the lower end thereof seated on said lip, horizontal and lateral portions, said cylindrical casing comprising a complementary lip, horizontal and lateral portion on which the upper end of said filter element seats, said cylindrical casing thereafter extending downwardly and inwardly and joining a concave portion terminating in a convex central portion to form a flame deflector, the outer wall of said cylindrical casing being spaced outwardly from said filter element and extending downwardly adjacent the lower edge thereof to provide an annular inlet opening therearound and means for securing said casings and filter element to each other.

2. The filter of claim 1 wherein the downwardly and inwardly portion of the upper casing extends approximately one third of the height of said filter element and at an angle of approximately 60 degrees with the horizontal.

References Cited in the file of this patent

UNITED STATES PATENTS

| | | |
|---|---|---|
| 2,064,207 | Jacobs | Dec. 15, 1936 |
| 2,387,303 | Sebok | Oct. 23, 1945 |
| 2,782,933 | Monsarrat | Feb. 26, 1957 |

FOREIGN PATENTS

| | | |
|---|---|---|
| 1,119,440 | France | of 1956 |